(12) United States Patent
Weber et al.

(10) Patent No.: US 10,106,043 B2
(45) Date of Patent: Oct. 23, 2018

(54) CHARGING DEVICE FOR AN ELECTRIC VEHICLE

(71) Applicant: Bayerische Motoren Werke Aktiengesellschaft, Munich (DE)

(72) Inventors: Martin Weber, Altomuenster (DE); Andreas Kurtz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 279 days.

(21) Appl. No.: 14/848,719

(22) Filed: Sep. 9, 2015

(65) Prior Publication Data

US 2015/0375627 A1  Dec. 31, 2015

Related U.S. Application Data

(63) Continuation of application No. PCT/EP2014/054689, filed on Mar. 11, 2014.

(30) Foreign Application Priority Data

Mar. 12, 2013 (DE) .................. 10 2013 204 256

(51) Int. Cl.
*H02J 7/00* (2006.01)
*H02J 7/14* (2006.01)
(Continued)

(52) U.S. Cl.
CPC ......... *B60L 11/1809* (2013.01); *B60L 3/0069* (2013.01); *B60L 11/185* (2013.01);
(Continued)

(58) Field of Classification Search
USPC ....... 320/134, 135, 136, 137, 109, 107, 104; 307/9.1, 31, 64, 75, 105, 47, 66
See application file for complete search history.

(56) References Cited

U.S. PATENT DOCUMENTS

2010/0237694 A1* 9/2010 Fuma .................... B60L 11/123
                                                                    307/9.1
2012/0026767 A1* 2/2012 Inoue .................... H02M 7/217
                                                                    363/89
(Continued)

FOREIGN PATENT DOCUMENTS

CN         102935812 A      2/2013
DE   10 2010 062 362 A1     6/2012
(Continued)

OTHER PUBLICATIONS

International Search Report dated Nov. 7, 2014 (Three (3) pages).
(Continued)

*Primary Examiner* — Alexis Pacheco
(74) *Attorney, Agent, or Firm* — Crowell & Moring LLP

(57) ABSTRACT

The invention relates to a charging device for an electric vehicle that can be driven by an electrical energy store. The charging device has a charging interface outside the electric vehicle, which can be fed by a three-phase alternating current from an external three-phase alternating current network. The charging device provides a charging current at the output that can be fed via a charging cable to the electric vehicle in order to charge the electrical energy store. The charging interface comprises a converter device configured to convert the three-phase alternating current into a single-phase alternating current as the charging current, and to distribute a phase load on the conduction phase of the single-phase alternating current substantially uniformly onto the three conduction phases of the three-phase alternating current during operation.

17 Claims, 8 Drawing Sheets

(51) Int. Cl.
    *B60L 11/18*   (2006.01)
    *H02J 5/00*    (2016.01)
    *B60L 3/00*    (2006.01)
    *H02J 3/26*    (2006.01)

(52) U.S. Cl.
    CPC ....... *B60L 11/1816* (2013.01); *B60L 11/1824*
        (2013.01); *B60L 11/1825* (2013.01); ***B60L
        11/1844* (2013.01); *B60L 11/1846*** (2013.01);
        *H02J 3/26* (2013.01); *H02J 5/00* (2013.01);
        *B60L 2210/30* (2013.01); *B60L 2210/40*
        (2013.01); *B60L 2230/10* (2013.01); *H02J
        7/0027* (2013.01); *Y02E 60/721* (2013.01);
        *Y02T 10/7005* (2013.01); *Y02T 10/7055*
        (2013.01); *Y02T 10/7088* (2013.01); *Y02T
        10/7241* (2013.01); *Y02T 90/121* (2013.01);
        *Y02T 90/127* (2013.01); *Y02T 90/128*
        (2013.01); *Y02T 90/14* (2013.01); *Y02T 90/169*
        (2013.01); *Y04S 10/126* (2013.01); *Y04S 30/14*
        (2013.01)

(56) References Cited

U.S. PATENT DOCUMENTS

| | | | |
|---|---|---|---|
| 2012/0191253 A1* | 7/2012 | Rockenfeller | F24F 3/00 |
| | | | 700/276 |
| 2012/0235605 A1* | 9/2012 | Jang | B60L 11/1803 |
| | | | 318/139 |
| 2013/0049677 A1 | 2/2013 | Bouman | |
| 2013/0163125 A1* | 6/2013 | Udagawa | H01H 9/563 |
| | | | 361/35 |
| 2014/0042967 A1 | 2/2014 | Herzog | |
| 2014/0266017 A1* | 9/2014 | Hamada | H01M 10/44 |
| | | | 320/107 |
| 2014/0354240 A1* | 12/2014 | Wang | B60L 11/1816 |
| | | | 320/136 |

FOREIGN PATENT DOCUMENTS

| | | |
|---|---|---|
| DE | 10 2011 007 839 A1 | 10/2012 |
| DE | 10 2011 078 047 A1 | 12/2012 |
| WO | WO 2012/169050 A1 | 12/2012 |

OTHER PUBLICATIONS

German Search Report dated Jan. 17, 2014, with Statement of Relevancy (Five (5) pages).

Chinese Office Action issued in Chinese counterpart application No. 201480012541.4 dated Jul. 4, 2016, with English translation (Fourteen (14) pages).

Chinese Office Action issued in Chinese counterpart application No. 201480012541.4 dated Feb. 7, 2017, with partial English translation (Thirteen (13) pages).

\* cited by examiner

CHARGING DEVICE FOR AN ELECTRIC VEHICLE

CROSS REFERENCE TO RELATED APPLICATIONS

This application is a continuation of PCT International Application No. PCT/EP2014/054689, filed Mar. 11, 2014, which claims priority under 35 U.S.C. § 119 from German Patent Application No. 10 2013 204 256.6, filed Mar. 12, 2013, the entire disclosures of which are herein expressly incorporated by reference.

BACKGROUND AND SUMMARY OF THE INVENTION

The invention relates to a charging device for an electric vehicle.

It is known from the prior art to charge the electrical energy store provided for driving an electric vehicle via a single-phase AC charging system. In this case, single-phase alternating current is supplied from an electrical connection via a charging cable to a corresponding connection on the vehicle side. The alternating current is converted into direct current in the vehicle via a charger, and this direct current is used for charging the electrical energy store.

Conventional electrical connections which are used in private households, for example, already provide a single-phase alternating current, but the power of such connections is limited to 3.7 kW or 16 A at most. Therefore, such connections are not suitable for a so-called high-speed charging function of the electrical energy store in the vehicle, for which a power of 7.4 kW or a current of 32 A is generally required. Although a conventional single-phase electrical connection can possibly be rated for higher powers, in general a change to the installation of the current distribution towards the energy distribution grid of the energy provider is required for this purpose, which is associated with a high degree of complexity.

The document DE 10 2011 007 839 A1 discloses various vehicle charging devices in which the charging of an electrical energy store of an electric vehicle with a single-phase or three-phase alternating current is made possible via an external AC grid connection. Furthermore, the charging devices can be used for DC charging of the electric vehicle.

An object of the invention is to provide a charging device for an electric vehicle with which efficient charging of the energy store of the electric vehicle with single-phase alternating current is made possible in a simple manner.

One embodiment of the charging device, according to the invention, is provided for an electric vehicle which can be driven via an electrical energy store (for example via a battery). The term electric vehicle should in this case be understood broadly and includes any type of motor vehicle which has an electrical energy store for the drive thereof, such as, for example, truly electric vehicles or possibly also hybrid vehicles. The charging device according to the invention comprises a charging interface outside the electric vehicle, which charging interface can be fed at the input by a three-phase alternating current from an external three-phase AC grid and provides a charging current at the output, which charging current can be supplied via a charging cable to the electric vehicle for charging the electrical energy store. Preferably, in this case the charging cable is fixedly connected to the charging interface, i.e. it cannot be removed via a plug connector system. In this case, the charging cable should be considered to be part of the charging device. The term charging interface should be understood broadly here and below and can include, inter alia, a wallbox, a charging station or an EVSE (Electric Vehicle Supply Equipment). In particular, the charging interface can possibly also be part of the charging cable.

The charging device according to one embodiment of the invention is characterized by the fact that the charging interface thereof comprises a converter device for converting the three-phase alternating current into a single-phase alternating current as charging current, wherein the converter device is configured in such a way that a phase load or a phase current on the line phase of the single-phase alternating current is distributed substantially uniformly among the three line phases of the three-phase alternating current. In this case, the invention is based on the knowledge that, with a corresponding charging device, the three-phase alternating current of an AC grid can be used for charging an electric vehicle by being converted into a single-phase alternating current without the phase load being increased non-uniformly only on one phase of the AC grid in the process. As a result, higher currents can be supplied to the electric vehicle, which in turn results in quicker charging of the electrical energy store. Furthermore, in contrast to single-phase charging directly from the external AC grid, the load on the PEN conductor is kept low, as will be illustrated in more detail in the detailed description. The charging device according to one embodiment of the invention thus makes it possible to reduce the reaction on the external AC grid.

The use of a converter device having the above properties for single-phase AC charging of the electrical energy store of an electric vehicle is not known from the prior art. In a preferred embodiment, the converter device comprises an AC-to-DC-to-AC converter (also referred to as DC-link converter), which converts the three-phase alternating current into a direct current and this direct current into a single-phase alternating current.

In a particularly preferred configuration, the converter device is designed for converting a three-phase alternating current with a phase current of (at most) 16 A, i.e. the charging device is suitable for installation in conventional power distribution systems and in particular in power distribution systems in private households. In addition, the converter device is preferably designed for providing a single-phase alternating current with a phase current of (at most) 32 A. As a result, a single-phase AC quick-charging function is made possible for the electric vehicle.

In a further, particularly preferred embodiment, the charging interface comprises a control unit, which can communicate with the electric vehicle for controlling the charging operation of the electrical energy store via a communications line in the charging cable. Such control units are known and generally so-called pilot contacts are used for producing the connection between the control unit and the vehicle via the communications line.

In a further preferred embodiment, the charging interface furthermore comprises an AC-to-DC converter for converting the three-phase alternating current into a direct current as charging current. As a result, the charging interface can also be used additionally for DC charging of the electric vehicle. Preferably, in this case the charging interface comprises a multi-stage switch having a first and at least a second switching stage, which switch is controllable via the control unit, wherein, in the first switching stage, the AC-to-DC converter is electrically connected to the external three-phase AC grid and, in a second switching stage, the converter device according to the invention is electrically connected to the external three-phase AC grid. Possibly, in addition, a further second switching stage can be provided, in which the external three-phase AC grid is connected directly to a three-phase AC connection of the charging interface for providing three-phase alternating current as charging current, whilst bypassing the converter device.

In a further preferred embodiment, the charging interface comprises a plurality of electrical taps, which are connectable or connected, with the same assignment, to electrical lines of the charging cable, wherein at least the line phase and the neutral phase of the single-phase alternating current and grounding are provided via the plurality of electrical taps.

In the case where the charging device also enables the function of DC charging, the plurality of electrical taps furthermore comprises two taps for providing the direct current from the AC-to-DC converter. In a particularly preferred embodiment, in this case the charging device is constructed similarly to those charging devices in the above-cited document DE 10 2011 007 839 A1 which are intended for single-phase AC charging via a single-phase AC grid. In addition, however, the converter device is provided for converting a three-phase alternating current into a single-phase alternating current. Preferably, the plurality of electrical taps furthermore comprises a tap for connection to the communications line described above in the charging cable. The entire disclosure of the document DE 10 2011 007 839 A1 is incorporated by reference in the present application.

In a further configuration of the invention, a three-phase AC connection of the charging interface is connectable directly to the external three-phase AC grid whilst bypassing the converter device. This can be achieved via a corresponding switching device, which is preferably actuated via the above-described control unit.

In a further variant of the invention, in which an AC-to-DC converter is provided for DC charging and the converter device is in the form of an AC-to-DC-to-AC converter, the AC-to-DC converter is a converter stage of the AC-to-DC-to-AC converter when providing a single-phase alternating current as charging current. This can be achieved by a switching device on the output side of the AC-to-DC converter, which switching device is preferably actuated via the above-described control unit.

In a particularly preferred embodiment, the charging interface for charging the electrical energy store of the electric vehicle is provided on the basis of the standard known as International Electrotechnical Commission 62196 ("IEC 62196").

That is to say that all of the male connector/female connector connections for connecting the charging cable to the vehicle and all of the charging modes of this standard can also be realized in the charging device according to the invention if the corresponding connection or the corresponding charging modes enable single-phase AC charging.

Exemplary embodiments of the invention will be described in detail below with reference to the attached figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
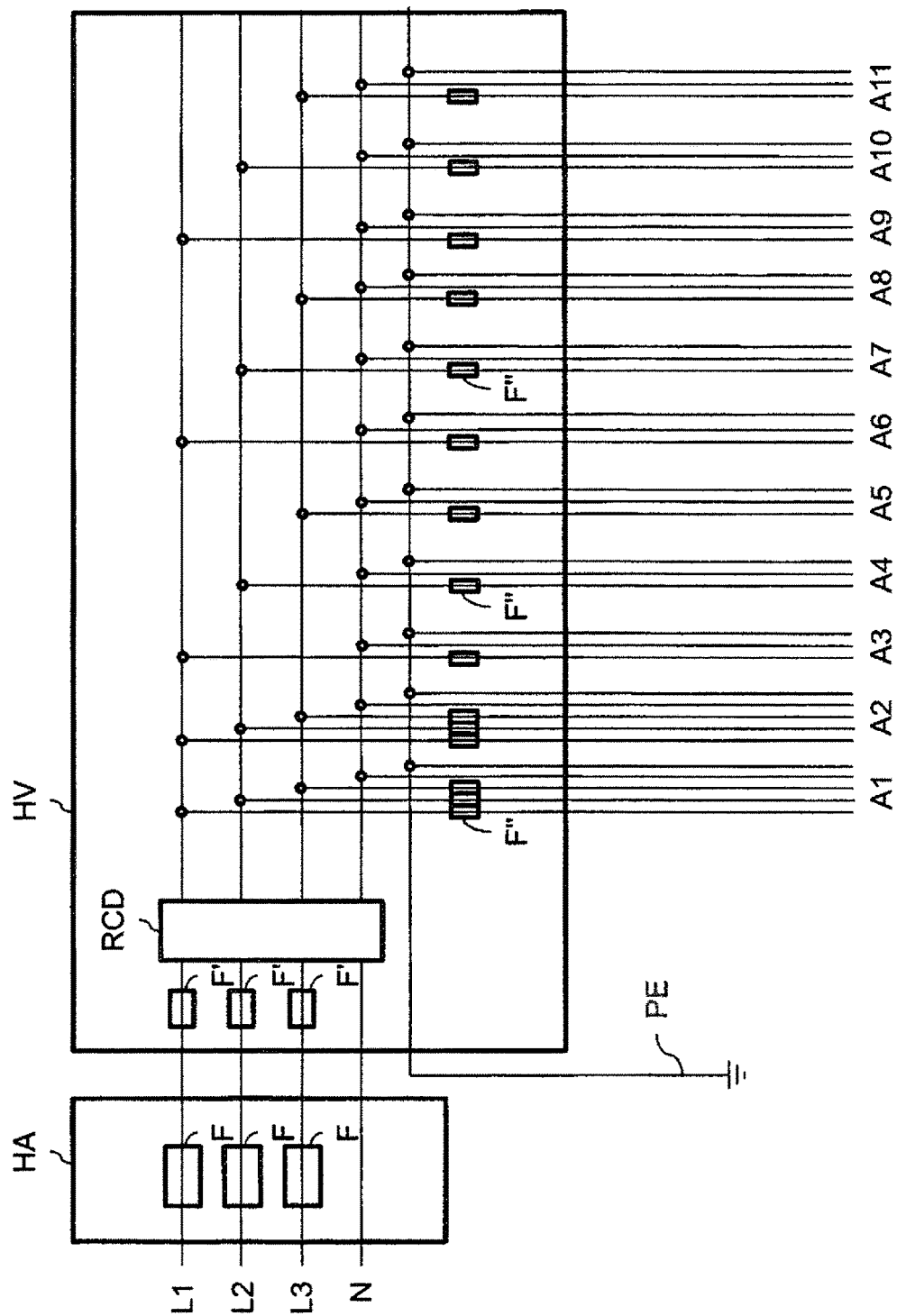
FIG. 1 shows an example of a conventional power distribution system in a household in which the charging device according to the invention can be installed.

FIG. 1 shows a schematic illustration of an example of a conventional power distribution system in a private household. The power distribution system illustrated comprises, in a manner known per se, the domestic connection HA, via which alternating current with the three line phases L1, L2 and L3 and the neutral phase N is provided from an external three-phase AC grid of an energy provider. In the embodiment described here, the AC grid is a 230 V electrical grid. However, the invention can also be used for AC grids in other voltage ranges. The domestic connection is safeguarded with respect to overcurrents by means of three fuses F. In the embodiment described here, these are 50 A fuses.

The domestic connection HA is adjoined by the actual domestic distribution system HV, in which three 35 A fuses F' for the three phases L1 to L3 and a residual current protection device RCD and grounding PE are provided. The individual phases of the alternating current are provided at corresponding electrical connections or socket outlets in the house, which are denoted by A1 to A11 in FIG. 1. The connections A1 and A2 are three-phase connections, and the connections A3 to A11 are single-phase connections. The corresponding phase lines to the connections are in turn safeguarded by means of 16 A fuses F''', only some of which are provided with this reference symbol for reasons of clarity. Generally, the three-phase AC connections A1 and A2 are provided for the electric oven in the household or represent a so-called CEE socket outlet or other country-specific three-phase grid connections, to which three-phase consumers can be connected. The other connections A3 to A11 are conventional socket outlets for the individual consumers in the rooms of the household. In the embodiment described here, it is assumed that the connection A2 is a CEE socket outlet, which is provided in the garage of the household and which is used, within the scope of the embodiment of the invention described here, to charge the electrical energy store of a vehicle.

Figure 2:
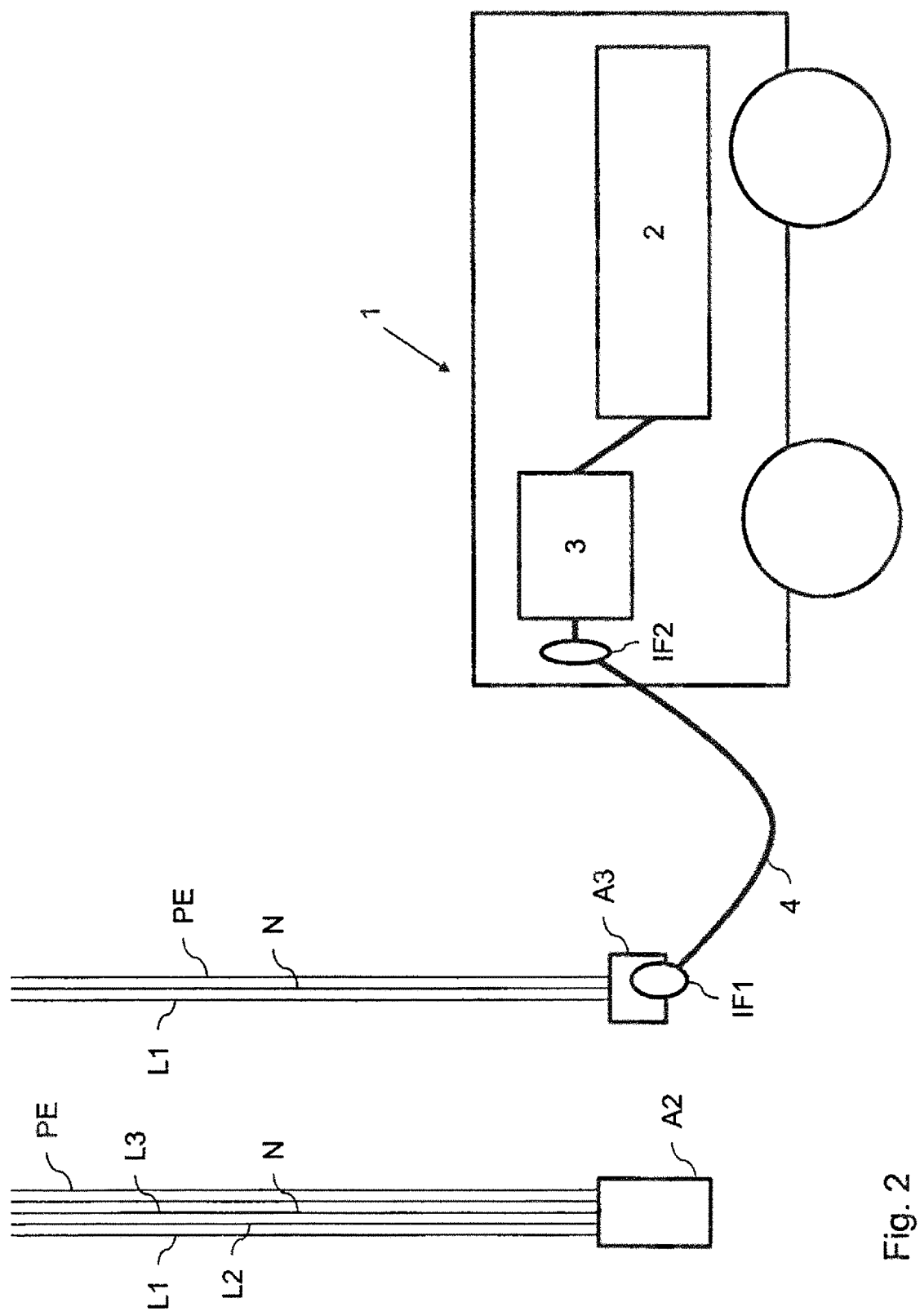
FIG. 2 shows a schematic illustration of conventional single-phase AC charging of a vehicle by means of the domestic distribution system shown in FIG. 1.

FIG. 2 shows an electric vehicle comprising a single-phase AC charging system, with which quick-charging of the electrical energy store of the vehicle is made possible.

The vehicle is in this case denoted by the reference symbol 1 and the electrical energy store thereof is denoted by the reference symbol 2. For AC charging, an internal charger 3 in the form of an AC-to-DC converter is provided, which converts the single-phase alternating current provided into a corresponding direct current for charging the energy store. As part of the quick-charging, a power of up to 7.4 kW with a current of 32 A can be supplied to the electrical energy store 2.

In order to charge the vehicle using the conventional domestic distribution system in FIG. 1, said vehicle needs to be connected to a single-phase connection of the domestic distribution system. This takes place in the scenario shown in FIG. 2 via the connection A3. In this case, a charging cable 4 produces the electrical connection between the vehicle 1 and the single-phase AC connection A3 via corresponding interfaces IF1 on the side of the domestic connection and IF2 on the side of the vehicle. In this case, however, there is the problem that the line phase of the single-phase connection A3 is only rated for a phase current of 16 A. Accordingly, the quick-charging function cannot be used in the vehicle 1, but the vehicle is charged at a lower power.

Although there is the possibility of also installing a single-phase AC connection with a phase current of 32 A in a domestic distribution system, for this purpose a request for loading of the domestic connection needs to be made with the energy provider. In this case, a separate line in the domestic distribution system and, in extreme cases, from the transfer point of the energy provider to the household needs to be laid. In addition, sometimes other fuses or another residual current protection device need to be installed, which are designed for higher currents. This is associated with a great deal of complexity. Furthermore, such a single-phase 32 A connection has the disadvantage that, owing to the high single-phase loading during quick-charging of the vehicle, an unsymmetrical phase load in the domestic distribution system or in the connected energy distribution grid arises, which can result in faults, overloading of individual fuses or the like.

Figure 3:
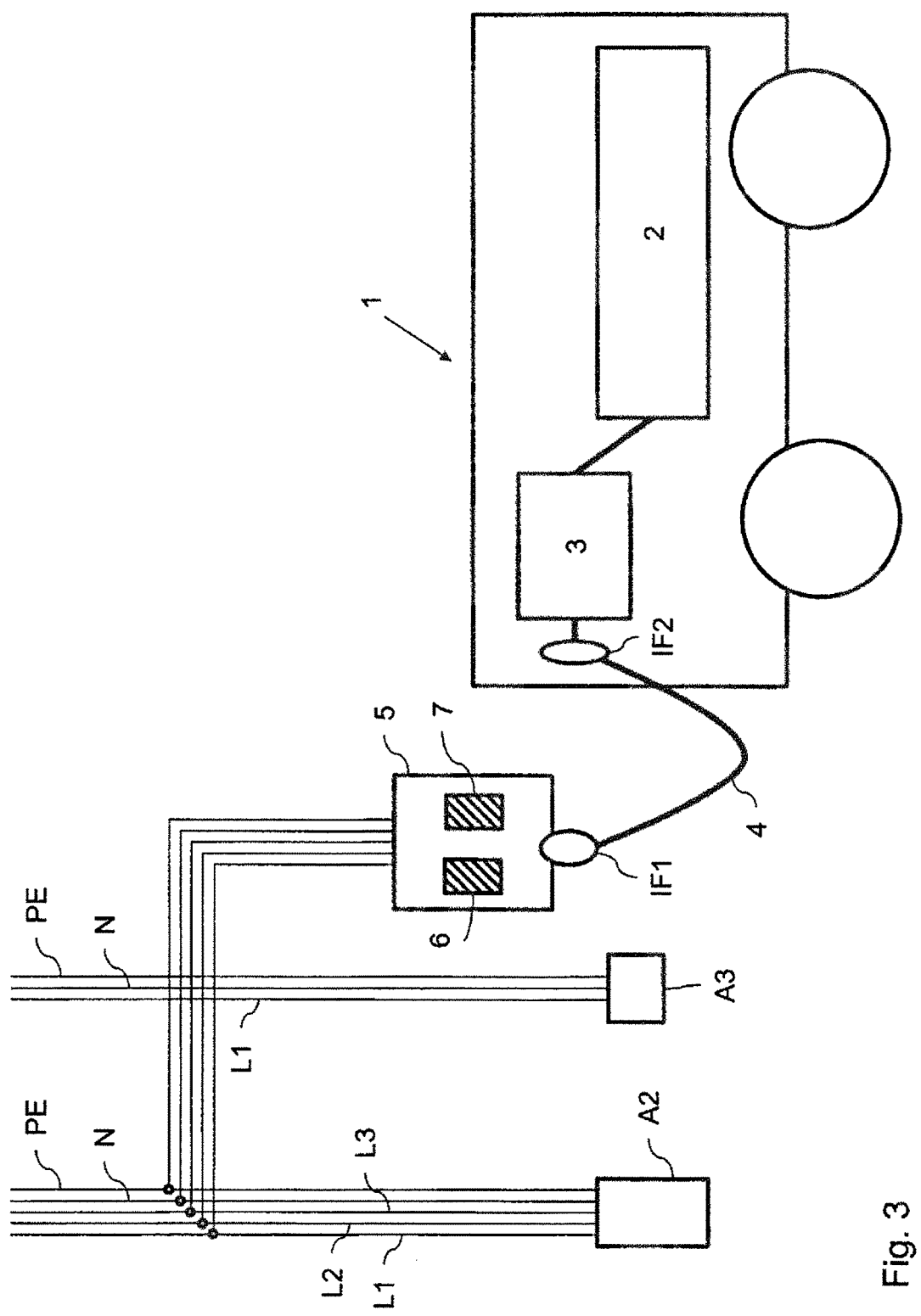
FIG. 3 shows a schematic illustration of single-phase AC charging by means of an embodiment of a charging station according to the invention which is installed in the domestic distribution system shown in FIG. 1.
Figure 4:
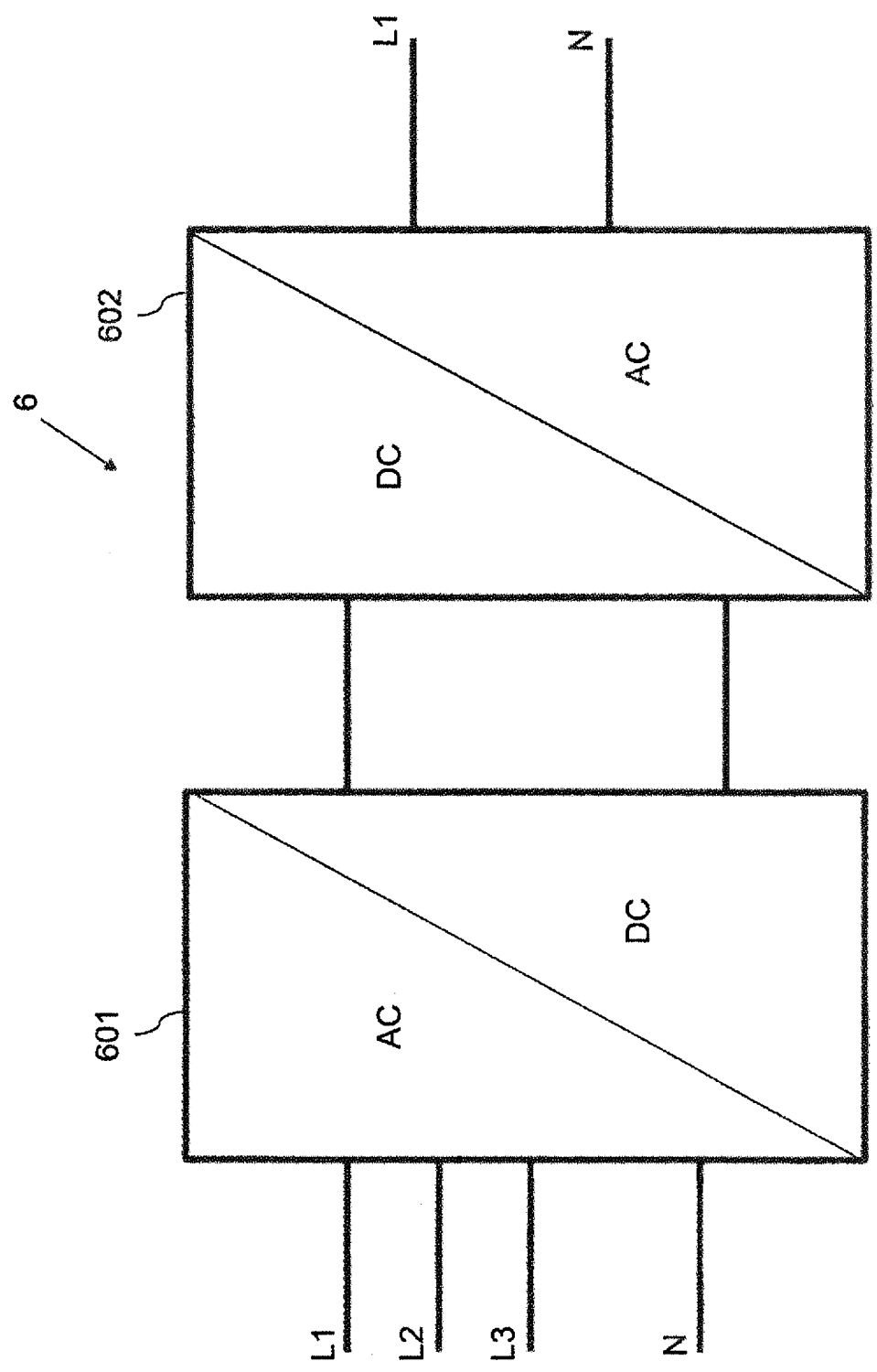
FIG. 4 shows a schematic illustration of a variant of a converter device installed in the charging station from FIG. 3.

In order to circumvent the above-described problem, a charging device in the form of an external charging station is used outside the vehicle, in accordance with the invention, which charging device is depicted by the reference symbol 5 in FIG. 3. The term charging station should be understood broadly in the text which follows and can include any type of external charging interface outside of the vehicle. The charging station is coupled to the three-phase AC connection A2 and converts the three-phase alternating current into a single-phase alternating current, which is supplied to the charger 3 in the vehicle and from there to the energy store 2 via the corresponding interfaces IF1 and IF2 and the charging cable 4. In this case, the charging station 5 contains a corresponding converter device 6, which, in the embodiment described here, is in the form of an AC-to-DC-to-AC converter (see FIG. 4). In addition, the charging station comprises, in a manner known per se, a control unit 7, which can communicate with a corresponding control device (not shown) of the vehicle 1 via a communications line in the charging cable.

In the embodiment described here, the charging operation takes place in a manner known per se on the basis of the standard IEC 62196, wherein a suitable male connector/female connector system of this standard is used for connecting the charging cable to the vehicle. The communication between the control units of the charging station and the vehicle takes place via a pilot line, known per se, in the charging cable. In addition, a proximity contact is provided between the male connector and the female connector, via which proximity contact the maximum current-carrying capacity of the charging cable is fixed by means of resistor coding. As part of the AC charging, all male connector systems or charging modes from the standard IEC 62196 can be used if they enable single-phase AC charging. If appropriate, the male connector system can also be a combination male connector, which additionally enables DC charging of the electrical energy store 2. In this case, a further AC-to-DC converter is integrated in the charging station 5.

FIG. 4 once again in a schematic illustration shows a configuration of the converter device 6 shown in FIG. 3. As mentioned above, the converter device represents an AC-to-DC-to-AC converter, whose construction is known per se from the prior art. The converter comprises an AC-to-DC converter 601, which has inputs for the three-phase alternating current in the form of corresponding lines L1, L2, L3 and N. The converter 601 generates a direct current on the output side, which direct current is then converted by a DC-to-AC converter 602 into the single-phase alternating current with the phases L1 and N. In addition, the grounding PE, which is not shown in FIG. 4, runs between the converters.

Figure 5:
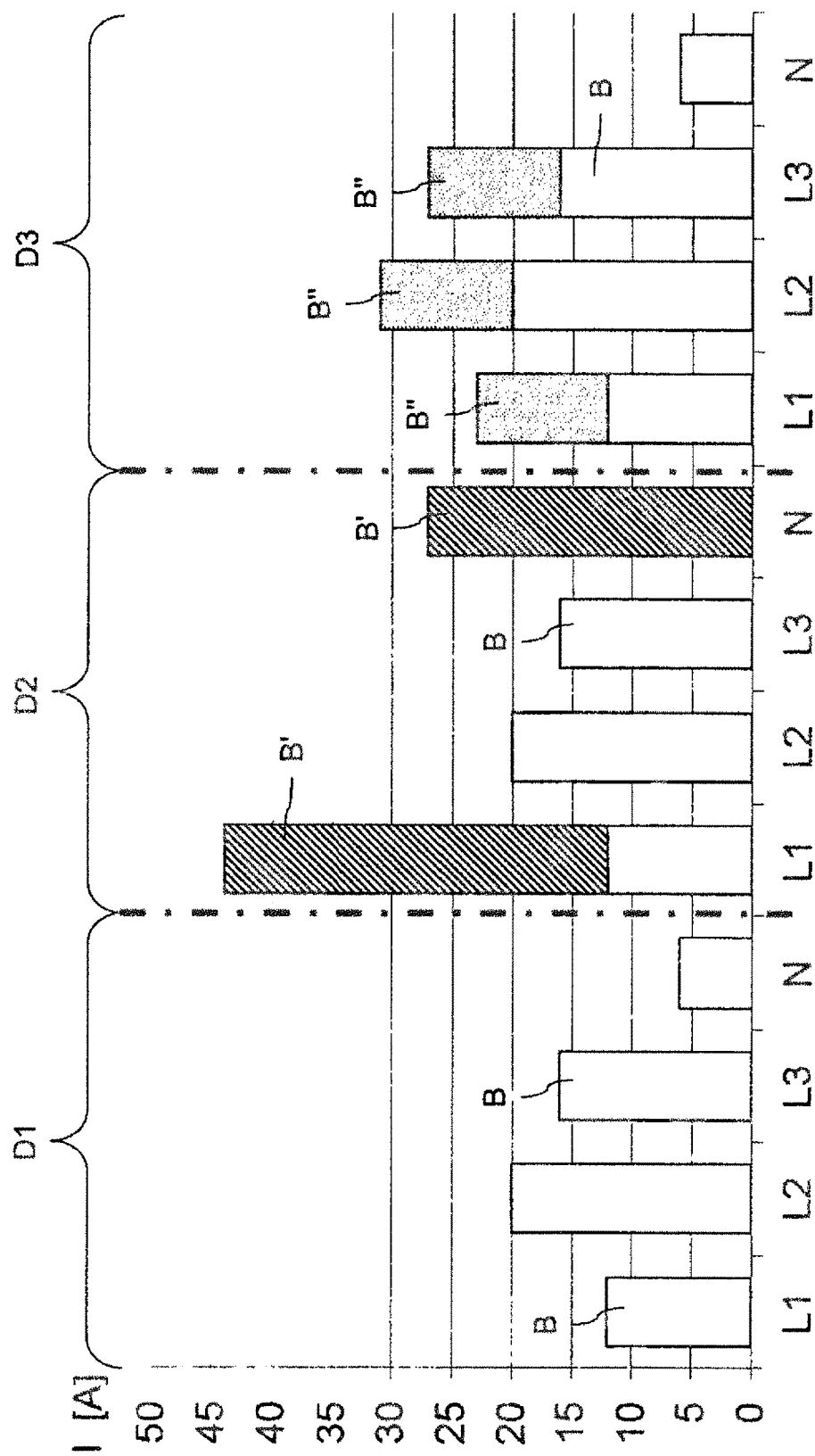
FIG. 5 shows a graph which compares, by way of example, the phase loads occurring during use of the charging station according to the invention with the phase loads without the use of this charging station.

Vehicle-side quick-charging with a charging current of 32 A and with a symmetrical phase load on the phase lines at the input of the charging station 5 is enabled by the charging station shown in FIG. 3. This is explained again in the graph as shown in FIG. 5. In this graph, a basic load present in the domestic distribution system shown in FIG. 1 with corresponding currents on the individual phases L1, L2, L3 and N (i.e. on the lines downstream of the residual current protection device RCD) is indicated by way of example by white bars B, which for reasons of clarity are only sometimes provided with this reference symbol. FIG. 5 in this case shows different scenarios which are indicated by sections D1, D2 and D3. Scenario D1 in this case shows purely the basic load without a charging operation of a vehicle via the charging station 5. The scenario according to D2 relates to single-phase AC quick-charging with a single-phase AC connection of the domestic distribution system, which is rated for 32 A by changing the domestic installation, as described above. As is indicated by the hatched bars B', the single-phase charging current on the line L1 results in an unsymmetrical phase load and therefore in severe loading of the PEN conductor N. The scenario according to D3 shows the single-phase quick-charging of the vehicle by means of a charging station according to the invention. As can be seen, the unsymmetrical phase load at the output of the charging station results in an additional symmetrical phase load owing to the conversion in the charging station, in the case of which an additional current of approximately a third of the output current of the charging station occurs on each line phase, as is indicated by the dotted bars B". Accordingly, single-phase quick charging of the vehicle does not have a negative influence on the load distribution and does not generate any additional PEN conductor load.

Figure 6:
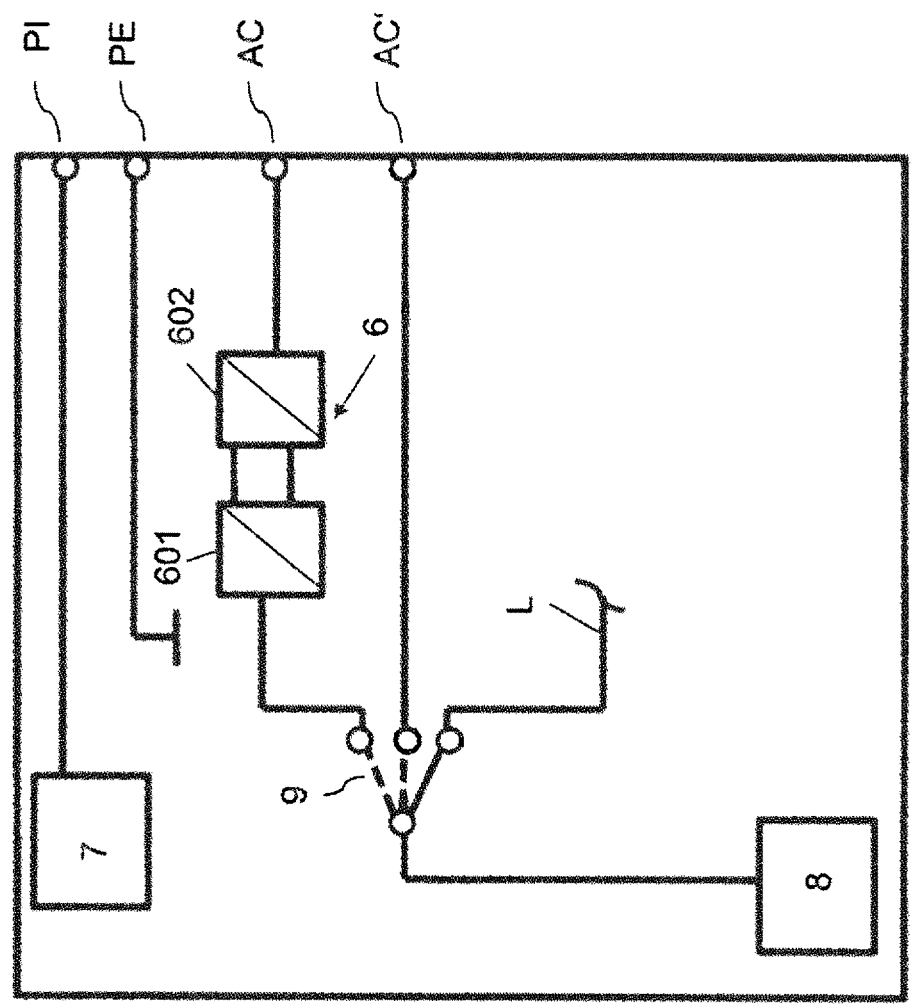
FIG. 6 to FIG. 8 show schematic illustrations of different variants of a charging station according to the invention.

FIG. 6 shows a preferred embodiment of a charging station according to the invention. The charging station comprises, in a manner known per se, a control unit 7 for connection to the pilot connection PI and grounding PE. In addition, the charging station contains the converter device 6 already described above in the form of an AC-to-DC-to-AC converter with the AC-to-DC converter 601 as first converter stage and the DC-to-AC converter 602 as second converter stage. The converter leads to the AC connection AC, at which a single-phase alternating current of 32 A is provided. In addition, a further AC connection AC' is provided, at which a three-phase alternating current of 16 A is provided. The charging station is fed a three-phase alternating current from an external AC grid via the grid connection 8. In addition to the two AC connections AC and AC', in addition further connections can also be provided, as is indicated schematically by the line L. A further connection can be, for example, a connection for DC charging. If appropriate, the connections AC and AC' can be combined to form one connection.

In accordance with the embodiment shown in FIG. 6, a switch 9 is provided with which, as desired, charging with single-phase alternating current via the connection AC or with three-phase alternating current via the connection AC' or possibly in another way via further connections is made possible. By selecting the corresponding switch positions of the switch 9, the corresponding type of charging can be selected. In the uppermost switch position, in this case single-phase AC charging with a symmetrical phase load is ensured. In the central switch position, in which the grid connection 8 is connected directly to the connection AC', three-phase AC charging is enabled. The lower switch position enables charging via a further connection, such as a DC connection, for example. The charging station illustrated in FIG. 6 may be a charging station in accordance with the standard IEC 62196.

Figure 7:
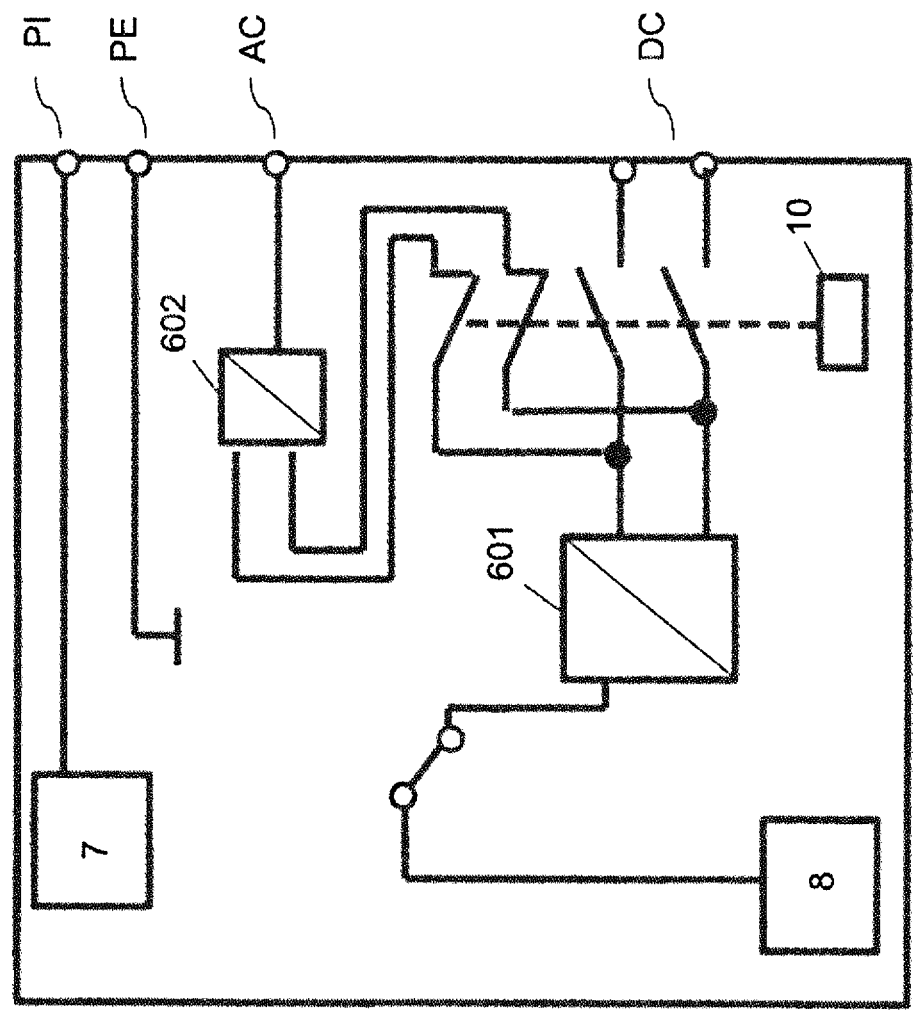
Figure 8:
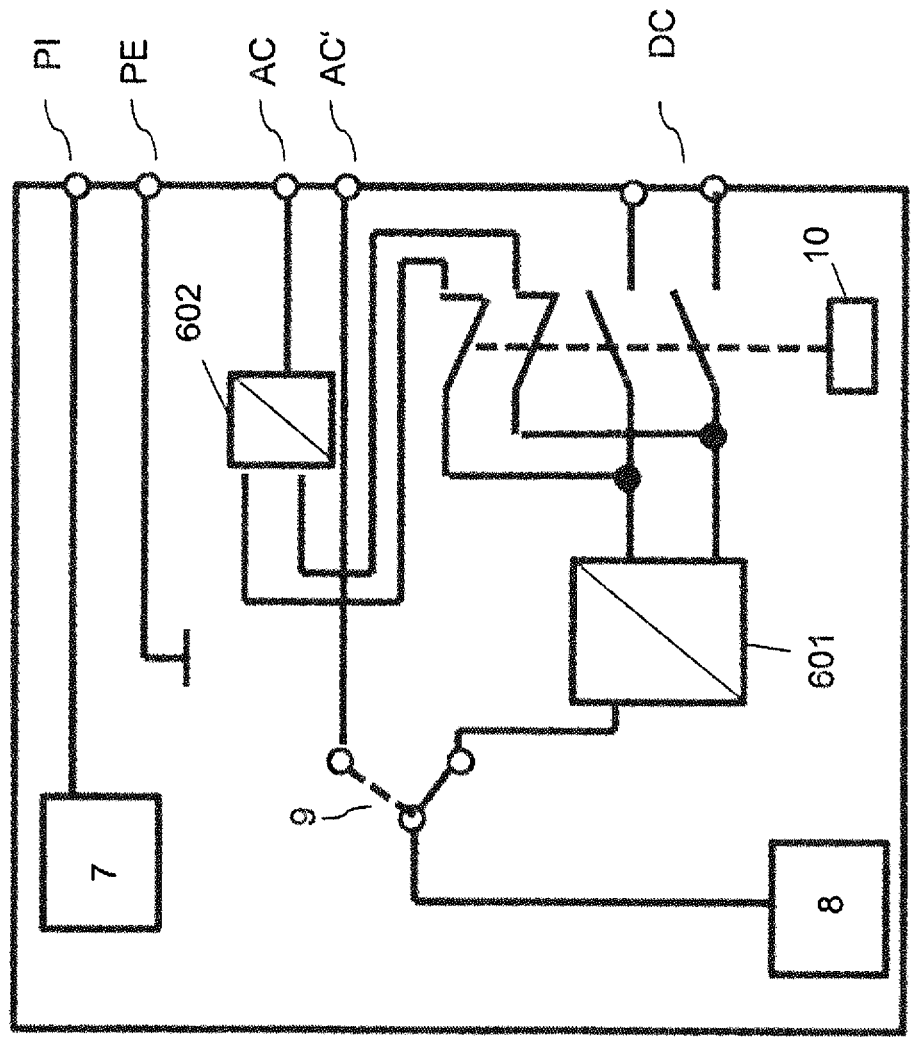

FIG. 7 and FIG. 8 relate to further modifications of a charging station according to the invention, wherein the same reference symbols as in FIG. 6 have been used for denoting the same components. The corresponding components are not described in detail again. In the embodiment shown in FIG. 7, the switch 9 and the connection AC' are no longer provided. For this purpose, a connection DC for DC charging is provided as well as a switching device 10, which can open or close a connection between the AC-to-DC converter 601 and the connection DC and which can open or close a connection between the AC-to-DC converter 601 and the DC-to-AC converter 602. The variant shown in FIG. 7 is characterized by the fact that the AC-to-DC converter is both part of the converter device 6 and is used as AC-to-DC converter for DC charging. This is achieved by corresponding switch positions of the switching device 10. In the switch position illustrated in FIG. 7, charging with single-phase alternating current via the connection AC takes place. After a change to a switch position in which a connection to the connection DC is produced and the connection between the converter 601 and the converter 602 is open, DC charging takes place via the connection DC using the AC-to-DC converter 601.

FIG. 8 shows a modification of the charging station shown in FIG. 7. In contrast to FIG. 7, the charging station additionally comprises a three-phase AC connection AC', to which three-phase alternating current can be supplied directly from the grid connection 8 by means of a switch 9. In addition, the charging station, similarly to the embodiment shown in FIG. 7, enables charging with single-phase alternating current via the connection AC or with direct current via the connection DC. The charging station shown in FIG. 8 in this case represents an extension of the charging stations described in the document DE 10 2011 007 839 A1 by a connection to the single-phase AC charging.

The embodiments of the invention described above have a number of advantages. In particular, single-phase quick-charging of the vehicle is enabled by a charging device or charging station outside of the vehicle without changes to the power distribution system via which the vehicle draws the charging current needing to be performed. In particular, the electrical cables at the input of the charging device only need to be designed for the current of a symmetrical phase load and not for the maximum current which is required by the electric vehicle. At the same time, a high single-phase load is prevented from resulting in overloading of the neutral conductor in the power distribution system, which in turn can result in faults in the power distribution system or the energy distribution grid.

REFERENCE SYMBOLS

L1, L2, L3 Line phases
N Neutral phase
HA Domestic connection
HV Domestic distribution system
F, F', F'' Fuses
PE Grounding
RCD Residual current protection device
A1, A2, . . . , A11 Electrical connections
IF1, IF2 Interfaces
1 Electric vehicle
2 Electrical energy store
3 Charger
4 Charging cable
5 Charging station
6 Converter device
601 AC-to-DC converter
602 DC-to-AC converter
7 Control unit
8 Grid connection
9 Switch
10 Switching device
PI Pilot connection
AC, AC' AC connections
DC DC connection
L Line
D1, D2, D3 Graphs
I Current
B, B', B'' Bars The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging device for an electric vehicle configured to be driven via an electrical energy store comprises:
    a charging station outside of the electric vehicle configured to be fed at an input by a three-phase alternating current from an external three-phase AC grid, configured to provide a charging current at an output, wherein the charging current is supplied to the electrical energy store of the electric vehicle via a charging cable,
    wherein the charging station comprises a converter device for converting the three-phase alternating current into a single-phase alternating current as the charging current, which converter device, during operation, distributes a phase load on the line phase of the single-phase alternating current substantially uniformly among the three line phases of the three-phase alternating current;
    wherein the converter device comprises an AC-to-DC-to-AC converter configured to convert the three-phase alternating current into a direct current, and to further convert the direct current into the single-phase alternating current.

2. The charging device as claimed in claim 1, wherein the converter device is configured to convert a three-phase alternating current with a phase current of up to 16 A.

3. The charging device as claimed in claim 1, wherein the converter device is configured to provide a single-phase alternating current with a phase current of up to 32 A.

4. The charging device as claimed in claim 1, wherein the charging station comprises a control unit configured to communicate with the electric vehicle to control the charging operation of the electrical energy store via a communications line in the charging cable.

5. The charging device as claimed in claim 1, wherein the charging station further comprises an AC-to-DC converter for converting the three-phase alternating current into a direct current as a charging current.

6. The charging device as claimed in claim 2, wherein the charging station further comprises an AC-to-DC converter for converting the three-phase alternating current into a direct current as a charging current.

7. The charging device as claimed in claims 5, wherein the charging station comprises a multi-stage switch having a first and a second switching stage, wherein the multi-stage switch is controllable via the control unit and wherein, in the first switching stage, the AC-to-DC converter is electrically connected to the external three-phase AC grid, and in the second switching stage, the converter device is electrically connected to the external three-phase AC grid.

8. The charging device as claimed in claims 6, wherein the charging station comprises a multi-stage switch having a first and a second switching stage, wherein the multi-stage switch is controllable via the control unit and wherein, in the first switching stage, the AC-to-DC converter is electrically connected to the external three-phase AC grid, and in the second switching stage, the converter device is electrically connected to the external three-phase AC grid.

9. The charging device as claimed in claim 8, wherein the charging station comprises a further second switching stage in which the external three-phase AC grid is connected directly to a three-phase AC connection of the charging station for providing three-phase alternating current as the charging current, while bypassing the converter device.

10. The charging device as claimed in 1, wherein the charging station comprises a plurality of electrical taps which are connectable to electrical lines of the charging cable, wherein at least a line phase and a neutral phase of the single-phase alternating current and grounding are provided via the plurality of electrical taps.

11. The charging device as claimed in 5, wherein the charging station comprises a plurality of electrical taps which are connectable to electrical lines of the charging cable, wherein at least a line phase and a neutral phase of the single-phase alternating current and grounding are provided via the plurality of electrical taps.

12. The charging device as claimed in claim 11, wherein the plurality of electrical taps comprises two taps for providing the direct current from the AC-to-DC converter.

13. The charging device as claimed in claim 11, wherein the plurality of electrical taps comprises a tap for connection to a communications line in the charging cable.

14. The charging device as claimed in claim 12, wherein the plurality of electrical taps comprises a tap for connection to a communications line in the charging cable.

15. The charging device as claimed in claim 1, wherein a three-phase AC connection of the charging station is connectable directly to the external three-phase AC grid while bypassing the converter device.

16. The charging device as claimed in claim 6, wherein the AC-to-DC converter is a converter stage of the AC-to-DC-to-AC converter when providing a single-phase alternating current as the charging current.

17. The charging device as claimed in claim 1, wherein the charging station for charging the electrical energy store of the electric vehicle is provided on the basis of International Electrotechnical Commission standard 62196.

\* \* \* \* \*